Aug. 12, 1924.
W. H. DEMPSEY ET AL
1,504,945
HOSE PROTECTOR
Filed March 24, 1924
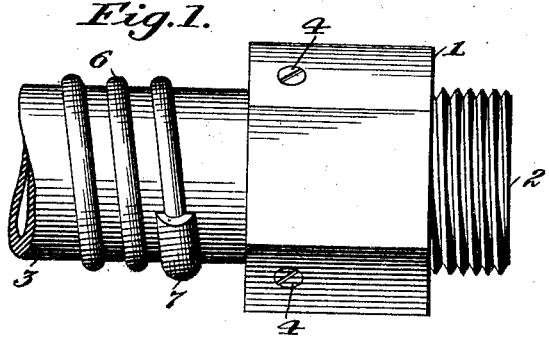
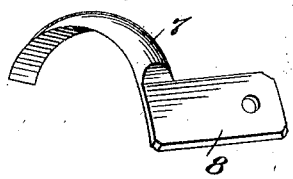
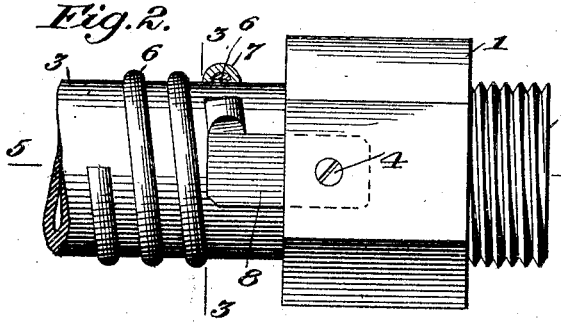
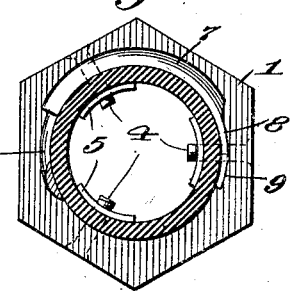
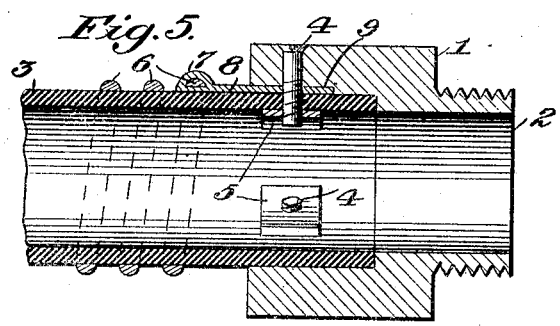
Inventors:
Wm. H. Dempsey
and O. J. Waggoner,
by G. W. H. Evans
Att'y.

Patented Aug. 12, 1924.

1,504,945

UNITED STATES PATENT OFFICE.

WILLIAM H. DEMPSEY AND ORON J. WAGGONER, OF ALTON, ILLINOIS.

HOSE PROTECTOR.

Application filed March 24, 1924. Serial No. 701,475.

*To all whom it may concern:*

Be it known that we, WILLIAM H. DEMPSEY and ORON J. WAGGONER, citizens of the United States, residing at Alton, in the county of Madison and State of Illinois, have invented certain new and useful Improvements in Hose Protectors, of which the following is a specification.

My invention relates to hose protectors. The object of the invention is to provide a hose coupling at its hose-receiving end with a simple and effective hose protector in the form of a tubular socket to receive the free end of the spirally wound hose-protecting wire and hold it out of contact with the hose itself and so prevent the end of the wire from cutting and injuring the hose.

This object we accomplish by the construction shown in the accompanying drawing, in which:

Fig. 1 is a side elevation of a coupling member, to which is attached a short piece of wire-protected hose with the free end of the wire within the curved wire-receiving hose protector.

Fig. 2 is a like view from the opposite side.

Fig. 3 is a transverse sectional view on line 3—3, Fig. 2.

Fig. 4 is a detail perspective of the curved protector detached.

Fig. 5 is a longitudinal section on line 5—5, Fig. 2.

The coupling member 1 has at one end the threaded extension 2 and at its opposite end an enlarged bore receiving the end of the hose 3 which is secured thereon by the screws 4 and nuts 5 in the usual manner.

The hose 3 is wrapped with a spirally wound wire 6, the free end of which has been heretofore held in various ways, none of which has proven entirely satisfactory in practice. We provide an entirely simple protector for the free end of the spiral winding 6 which comprises a curved tube at the non-threaded end of the coupling member 1. The protector 7 is shaped to correspond to the spiral wind of the wire wrapping 6.

It will be seen, therefore, that the end of the wire may be readily received within the tubular socket 7 and that no tools will be required in effecting the same. Furthermore, the hose will be effectually protected from injury by the wire end.

The protector 7 is shown provided with a laterally extending curved flange 8 lying within a recess 9 within the enlarged bore, where it is held by means of one of the attaching screws 4 and its nut 5, though it may be secured to the coupling in any desired manner, as by casting it integrally therewith. The protector is especially useful with wire wrapped air hose which are subjected to severe strain and rough usage and adds a longer life to the hose by preventing its cutting by the end of the wire wrapping. The hose may be replaced very easily when worn out, since the tubular protector may be slipped over the end of the wire or the wire slipped into the protector. Furthermore, the device prevents the wire about hose from creeping and thereby prevents blow out in hose.

What we claim is:

1. The combination with a wire wrapped hose and coupling member, of an external curved tubular protector on the hose-receiving end of said member and into which the free end of the wire wrapping extends.

2. The combination with a coupling member for wire wrapped hose, of an external tubular protector on the hose-receiving end of said member curved to fit the contour of the hose and adapted to receive the end of a spiral wrapping and hold it out of contact with the hose.

3. The combination with a coupling member for wire wrapped hose, of an external tubular protector on the hose-receiving end of said member curved to fit the exterior of the hose and also curved to correspond to the spiral wind of the hose wrapping.

4. A hose protector comprising a short length of tubing curved to correspond to a spiral wire wrapping, open at one end to receive the free end of said wrapping and provided at one end with a lateral attaching flange.

5. A pipe coupling member for wire wrapped hose provided at its hose-receiving end with an open ended spirally extending tubular protector adapted to receive the free end of the wire.

In testimony whereof we affix our signatures.

WILLIAM H. DEMPSEY.
ORON J. WAGGONER.